United States Patent Office 3,407,073
Patented Oct. 22, 1968

3,407,073
SOYBEAN TREATING PROCESS
Elio J. Guidarelli, Edina, Minn., assignor to Soy Food Products, Inc., Minneapolis, Minn., a corporation of Minnesota
No Drawing. Filed Aug. 16, 1965, Ser. No. 480,105
9 Claims. (Cl. 99—98)

ABSTRACT OF THE DISCLOSURE

Method of treating soybeans to produce a dry crunchy palatable bean by first swelling the bean, and then treating said swollen bean with infrared radiation having a peak wave length outside the effective water absorption range.

---

This invention relates to a method of treating soybeans for the purpose of improving the edibility and palatability of the soybeans, and to the resulting products. More particularly, the invention relates to a method by which the beans are first swollen, either because the moisture content of soybeans is substantially increased or because the beans are "puffed," and the beans are then heated by means of radiant energy of selected wave lengths for the purpose of roasting and debittering them. Optionally, the beans are seasoned or flavored at the same time, either before, during or after roasting.

Soybeans and soybean products have served as the chief source of protein in the diet of millions of oriental peoples for thousands of years. Various other oil seed products have been developed over the centuries for use as food in different parts of the world. However, since soybeans are adapted to a wide range of soil and climatic conditions and can be produced economically in many areas, they continue to be of special interest in the field of world-wide nutrition. Soya products, especially flour, grits and concentrated protein, are gaining rapidly in importance among occidental peoples everywhere as a source of high quality protein for use in foods. Soy sauce is one soybean product in common use in both oriental and occidental areas.

The extent of use of soybeans for food, particularly among occidental peoples, is far less than is suggested by the availability, low cost and nutritional quality of the soybean. One reason for this is that raw soybeans have an undesirable bitter taste. In addition, raw soybeans contain enzyme inhibitors which adversely affect their edibility. It is known that the flavor may be improved to some extent and the enzyme inhibitors destroyed by the application of heat. However, attempts to improve the edibility and palatability of soybeans by this means has been only partially successful.

In Patent No. 3,141,777, of which applicant is a joint patentee, there is disclosed a method of treating soybeans by means of infrared radiation. By this means it has been found that the enzyme inhibitors can be destroyed without substantially reducing the protein dispersibility of the soybeans and the undesirable flavor is modified to some extent. Soybeans so treated have found acceptance in animal feed, but have found no acceptance as human food. The patented process utilizes an infrared radiation source which peaks at between about 2 to 6 microns, the range of wave lengths most effectively absorbed by water. It has now been found that this is disadvantageous in that the bean is dehydrated at too rapid a rate and results in a hard dry product which is difficult to eat and, therefore, has not found acceptance.

It has now been found that soybeans may be successfully debittered, the enzyme inhibitors may be destroyed and the protein dispersibility retained by treating the soybeans with infrared radiation having a peak wave length range outside of the effective water absorption range, after swelling the bean by having first substantially increased the moisture content of the bean or by puffing in a high pressure steam gun. The result is a dry crunchy palatable bean having a nut-like flavor making it readily acceptable as human food. At the same time the edibility of a bean may be further enhanced by added seasoning or flavoring matter, such as salt, beef broth, chicken broth, anise, maple, banana, strawberry, cherry, vanilla, etc.

Broadly stated, the method according to the present invention includes the steps of swelling the beans (as by soaking the beans in hot water or other hot aqueous liquid below the boiling point in order to increase the moisture content of the beans substantially uniformly, or in a high pressure steam puffing gun), and then heating the swollen moist beans with infrared radiation having a peak wave length outside of the effective water absorption range. More particularly, according to one form of the invention, the moisture content of the beans may be increased by soaking to between about 35 and 75% by weight and the infrared heating is carried out with radiations having peak wave lengths between about 1 to 1.7 or between about 7 to 30 microns. The soaking of the beans to increase the moisture content causes the beans to swell substantially. The infrared heating of the moist beans roasts the beans to destroy their bitter taste and the enzyme inhibitors without materially adversely affecting the dispersibility of soybeans protein. The resulting beans are found to be dry and crunchy, easily edible and palatable and readily acceptable as human food. The added seasoning or flavoring may be incorporated into the soaking liquid. It may be added during roasting, as by spraying, or may be introduced into the beans after the infrared heating. In some instances it may be added as a coating to the finished roasted beans, for example coating beans with sugar or by dipping beans in chocolate. In addition to flavoring other materials may be added to the beans, such as nutrients, vitamins and minerals, immune milk and the like.

The beans may be swollen simply by soaking for long periods of time at room temperature. However, by soaking in hot water or other hot aqueous liquid in the range between about 180 and 210° F. the same effect can be obtained in about 10 to 45 minutes as that from soaking at room temperature for 20 to 24 hours. Longer soaking of 1 to 20 hours or more is not objectionable, but is usually unnecessary. By soaking under pressure, as in a pressure cooker, higher temperatures may be used and less time is required. When the beams are expanded by puffing they are subjected to high pressure steam in the range of about 90 to 200 pounds per square inch in a closed pressure vessel for about 2 to 5 minutes to insure complete penetration of the bean by moisture and then the pressure vessel is opened to expand the beans as a result of expansion of the moisture contained within. The beans attain a high moisture content of the order of about 50 to 75% under high steam pressure. Upon puffing the moisture content may be reduced to the range of about 5 to 15%. It has been found that beans expanded in this manner have substantially uniform moisture content and are well adapted to infrared treatment. The beans swollen by soaking expand to about 3 times their raw size and change shape generally from spherical to ovoid. Then, after toasting, they lose about ⅓ of their soaked size.

The toasted beans produced by the method of this invention may be used as the principal staple dietary meal where needed as, for example, in areas beset by famine and the like. It may be used as a diet supplement anywhere. Providing toasted beans in whole bean form makes shipping, distribution and storage easy, even in the most under-developed areas. In more affluent societies, where meeting of minimum dietary requirement is not a problem, the toasted and flavored beans may be used as snacks, appetizers, confectionery products and the like. Sweetened beans may be used as a substitute for candy to satisfy cravings for sweets without the attendant disadvantages. The beans may be flavored to meet the tastes of varying cultures. In addition to being utilized in bean form, the toasted bean may be ground and mixed with a viscous binder, such as edible fats and oils, i.e., cooking oil or salad oil, or gelatin, or jelly or the like, and used as a table spread. For example, toasted beans flavored simply by soaking in a brine, toasted and ground and made into a spread closely resembles peanut butter in appearance, odor and taste.

The toasting by infrared radiation is carried out by means of infrared heaters designed to most effectively emit infrared radiation at wave lengths outside of the effective water absorption range. Gas burner equipment is available utilizing a replaceable double ceramic grid. The beans are preferably toasted by passing them on a conveyor in a relatively thin layer of from one up to about 4 or 5 beans thick in close proximity to the burners. Typical spacing between burner and beans is from about 6 to 18 inches. The beans are desirably subject to some agitation, such as tumbling, either as a result of movement of the belt or vibration of the conveying means. Depending on conveyor speed, a typical installation may be from about 75 to 150 feet long.

The gas burner operates at a surface temperature of up to about 2500 to 2600° F. and preferably about 1600 to 1700° F. in the wave length region of between about 1 to 1.7 microns. In the wave length region above about 7 microns the temperature is lowered in the range of about 300 to 400° F. These higher wave length radiations have great affinity for oil and good absorption by oil is attained at about 8 to 9 microns. Production of radiation of the desired peak wave length is determined by calculation using Planck's law as understood in the art. The temperature attained is determined by gas pressure and jet orifice size. A preferred burner is a ceramic grid having about 200 holes per square inch. The beans are normally subjected to infrared radiation for a time range between about 5 to 15 minutes depending upon temperature and moisture content and attain a product temperature between about 200° to 300° F.

In my earlier Patent No. 3,141,777 the method described includes subjecting soybeans to heat treatment with infrared radiation having a heat wave length of between about 2 and 6 microns which is the wave length range most effectively absorbed by water. It is known that some of those substances which interfere with the function of the proteolytic enzymes which convert protein to amino acids and polypeptides can be inactivated by heating in the presence of water. It has now been found that in order to effect deepest penetration of the particles and to insure more uniform and thorough heating by increasing the penetration of the infrared into the soybeans the roasting must be conducted outside of the water absorption range. Otherwise the radiation energy is absorbed by the water, heating and evaporating it to materially reduce the moisture content while leaving the remainder of the bean uncooked or partially cooked and without inactivating the enzyme inhibitors. According to the present invention the penetration ability of the infrared energy is markedly increased due to use of wave lengths which have lesser affinity for water, and are not absorbed by the water within the soybeans.

When the toasted soybeans are used as food for human consumption it is desirable that they be dehulled. The hull contains about 30 to 40% fiber, as contrasted with only about 5% fiber in the overall bean. The hulls are easily removed during the swelling step. When the beans are soaked the hulls swell and become loose and are easily separated by agitation. Then, they float to the surface and are skimmed off. Because of the modulus of elasticity of the bean the swollen bean does not return to its original size upon roasting, but does shrink somewhat. During cooling a vacuum is formed within the bean which tends to draw the added flavoring or seasoning material into the body of the bean.

The invention is further illustrated by the following examples which are intended to be explanatory only and do not impose any limitations upon the invention apart from the limitations recited in the appended claims.

EXAMPLE I

One hundred pounds of raw soybeans were soaked in two 10 gallon cans of water and sparged with steam for about 10 minutes to bring the water temperature up to about 212° F. and to agitate the beans. As the result of the combined soaking and agitation, the bean hulls expanded and were separated and floated to the tops of the cans where they were skimmed off and discarded. The steam was then disconnected and the beans were permitted to soak for an additional 30 minutes at about 200° F. At this time the beans had swollen to about 3 times their normal raw size and were determined to contain about 70% water. The beans were removed from the soaking vessels and drained and then exposed for 10 minutes to infrared radiation at 1.7 microns peak wave length calculated by Planck's law. A ceramic grid having 200 holes per square inch was used. The grid temperature was about 2500° F. to 2600° F. and the grid was almost white hot. The beans were spread in pans in a bed about ½ inch deep and placed on a vibrating conveyor passing under the gas burners. The spacing between burner and beans was approximately 8 inches. The conveyor moved at approximately 10 feet per minute and the array of burners was approximately 100 feet long so that the total exposure to infrared radiation was approximately 10 minutes. During exposure the bean temperature never exceeded 220° F. At the end of the roasting treatment the moisture content of the beans was about 2.9%. The beans were then sprayed with water to cool them and to bring the moisture content back to about 10% and quickly dried. The resulting product was dry and crunchy with palatable nut-like flavor.

EXAMPLE II

One hundred pounds of beans were placed in two 10 gallon cans of water and sparged with steam for 10 minutes. During this time the hulls expanded and the beans were agitated to remove the hulls, which were skimmed from the top of the liquid. Thereafter, the beans were soaked for an additional 30 minutes at about 200° F. in a water solution containing ¾ pound of salt and 8 ounces of water dispersible beef extract (Wilson) for each 100 pounds of raw beans. The beans were then removed from the solution and drained and roasted according to the procedure of Example I, sprayed with the same salt and beef extract solution and cooled. The resulting bean product had a slightly salty taste and a pleasant beef-like flavor. The beans found ready acceptance as cocktail snacks.

EXAMPLE III

Beans which were soaked and roasted according to Example I were impregnated with oil of anise. An emulsion of anise was prepared in the ratio of 1 part oil of anise to each 10 parts of water. The beans, while still warm from roasting, were soaked in this emulsion in the proportions of about 4 ounces of oil for each 100 pounds of product. The beans were soaked for about 20 minutes and cooled and dried. The beans had a distinct anise flavor which was appealing to persons having Mediterranean and Middle Eastern antecedents.

EXAMPLE IV

Beans which were soaked and roasted according to the procedure of Example I were impregnated with oil of anise by a different method in which the beans after roasting were placed in a pressure cooker with oil of anise in the proportion of 2 ounces of oil per each 100 pounds of bean product. The pressure cooker was closed and the pressure raised to the range between 225 and 250 pounds per square inch and held for 8 minutes. The oil was vaporized and penetrated the roasted beans to produce a product not unlike that of the previous example.

EXAMPLE V

Banana flavored soybeans were prepared. The beans were soaked and roasted according to the procedure of Example I and then impregnated with banana flavor utilizing the procedures of Examples III and IV, but substituting banana flavor for oil of anise.

EXAMPLE VI

Chocolate covered roasted soybeans were prepared. The beans were soaked and roasted according to the procedure of Example I. Then, the roasted beans were tumbled in molten chocolate to produce a confectionery product not unlike chocolate covered peanuts.

EXAMPLE VII

A quantity of raw soybeans were soaked for 35 minutes in a brine containing ¾ pound of salt for each 100 pounds of raw beans for 35 minutes at 190° F. At the end of this time the beans were agitated and all of the hulls which had separated and floated to the surface were skimmed off. The beans were drained and deposited in pans in thin layers and placed on a vibrating conveyor spaced from a ceramic grid gas burner 100 feet in length so that the beans were spaced approximately 10 inches from the burner. The burner was operated at approximately 400° F. to produce a peak wave length between 8 and 9 microns and the conveyor was moved at a rate of about 8 feet per minute for a total radiation time of about 12 minutes. There is good absorption by the natural oil of the soybean at this higher wave length. The bean temperature approached 225° F. The toasted bean had a moisture content of about 2%. The moisture content was adjusted to about 10% and flavoring added by spraying the roasted beans with chicken broth, and then cooling and drying. This bean product has an agreeable salty taste and chicken flavor and makes a good cocktail snack.

EXAMPLE VIII

A 3 inch laboratory puffing gun was substantially filled with raw soybeans and closed. High pressure steam of the order of 200 pounds per square inch was introduced into the gun for about 3 minutes. Then, the gun was opened to expel the contents and puff the beans by release of pressure and expansion of moisture contained within the beans. The moisture content of these beans after puffing was of the order of about 5 to 6%. The beans were then subjected to infrared radiation at about 1.5 microns peak wave length for about 8 minutes. The roasted beans were tumbled in melted butter and lightly salted to produce a snack product.

EXAMPLE IX

Raw soybeans were soaked for 55 minutes in water at 180° F. These beans were then exposed for 10 minutes 10 inches from an infrared rayhead. The product after roasting had excellent nutty taste and good texture. This product was then pulverized in a food blender to the finest possible grind. The resulting product had a strong peanut-like odor. The ground beans were then mixed with cooking oil to a pliable, spreadable consistency for use as a table spread. The product looked, smelled and tasted very much like peanut butter.

EXAMPLE X

A quantity of raw soybeans were soaked for 1 hour at 180° F. in water containing a mixture of 1 tablespoon of cinnamon and 1 tablespoon of artificial sweetener in each 2 cups of water. The beans were exposed to infrared for 10 minutes spaced 8 inches from the infrared rayhead. The product had a distinctive sweet cinnamon taste and good texture.

EXAMPLE XI

Raw soybeans soaked and roasted according to the procedure of Example I were impregnated with immune milk addition. The beans after roasting were soaked in cold liquid immune milk and subjected to high air pressure, and then drained and dried.

EXAMPLE XII

A quantity of beans were soaked in a pressure cooker in water, to which a small amount of garlic was added, for about 10 minutes at a temperature of about 300° F. These beans were then subjected to infrared for 9 minutes spaced 8 inches from the rayhead and then cooled and salted lightly. They had good taste and texture and were acceptable as cocktail snacks.

EXAMPLE XIII

A further soybean spread was made by taking soybeans after soaking and roasting according to the procedure of Example I and grinding to 100 to 200 mesh size. This ground product is then mixed with jelly in the proportion of 80% ground roasted bean to 20% jelly. The resulting product was a peanut butter-like spread of consistency such that it spread easily even at 20° F.

EXAMPLE XIV

Another soybean spread was prepared by grinding roasted soybeans to about 100 to 200 mesh size and mixing with prepared gelatin in the proportion of 90% soybean to 10% gelatin. This gave a product resembling peanut butter of consistency permitting it to be easily spread. A small amount of maple flavoring is added at the same time to enhance the flavor of the spread.

The raw soybean may if desired be defatted before roasting. Roasting the soybeans by the process of the present invention prevents overheating of the beans, which is detrimental to the protein. Roasting the means with moisture present in the cell structure of the beans prevents the binding of the protein and sugars and destroys the enzyme inhibitors that prevent the conversion of protein into amino acids and polypeptides. The infrared energy heats the water in the cell structure of the beans causing the beans to become tender and at the same time roasts the beans giving them a nut-like flavor. At the same time the normal heavy bean flavor is destroyed making the beans more palatable. The crunchiness of the beans is then controlled by regulating the final moisture content.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A method of improving the edibility and palatability of soybeans, which method comprises the steps of:
 (A) swelling the beans by soaking in a hot aqueous liquid below the boiling point at a temperature of about 180 to 210° F. for about 10 minutes to 1 hour to increase the moisture content substantially uniformly to between about 35 and 75% by weight, and then
 (B) heating the swollen beans with infrared radiation having a peak wave length between about 1 to 1.7 microns or between about 7 to 30 microns which is outside of the effective water absorption range to attain a bean temperature between about 200° F. and 300° F. for a period of time sufficient to roast the beans in order to destroy their original bitter taste and enzyme inhibitors without materially adversely affecting the dispersibility of soybean protein.

2. A method according to claim 1 further characterized in that said aqueous liquid is a dispersion of flavoring agent in water to flavor the soybeans substantially uniformly throughout simultaneously with said swelling.

3. A process according to claim 2 further characterized in that said dispersion is a solution of water soluble flavoring agent.

4. A method according to claim 1 further characterized in that said soybeans, after roasting, are subjected to an environment of absorbable heat sensitive flavoring agent.

5. A method of improving the edibility and palatability of soybeans, which method comprises the steps of:
  (A) swelling the beans by puffing by subjecting to high pressure steam in a closed pressure vessel in the range of about 90 to 200 pounds per square inch for about 2 to 5 minutes to substantially uniformly penetrate said beans with moisture and then opening said vessel to release the pressure and instantaneously expanding the beans by expansion of the moisture therein, and then
  (B) heating the swollen beans with infrared radiation having a peak wave length between about 1 to 1.7 microns or between about 7 to 30 microns which is outside of the effective water absorption range to attain a bean temperature between about 200° F. and 300° F. for a period of time sufficient to roast the beans in order to destroy their original bitter taste and enzyme inhibitors without materially adversely affecting the dispersibility of soybean protein.

6. A method according to claim 5 further characterized in that said soybeans, after roasting, are subjected to an environment of absorbable heat sensitive flavoring agent.

7. A method of making a palatable table spread comprising first swelling soybeans by soaking the beans in a hot aqueous liquid below the boiling point at a temperature of about 180 to 210° F. for about 10 minutes to 1 hour to increase the moisture content substantially uniformly to between about 35 and 75% by weight, and then heating the swollen beans with infrared radiation having a peak wave length between about 1 to 1.7 microns or between about 7 to 30 microns which is outside of the effective water absorption range to attain a bean temperature between about 200° F. and 300° F. for a period of time sufficient to roast the beans in order to destroy their original bitter taste and enzyme inhibitors without materially adversely affecting the dispersibility of soybean protein, and then grinding the roasted beans and blending with a viscous binder.

8. A method according to claim 7 further characterized in that said beans are swollen by soaking in a brine and, after roasting and grinding, are blended with a viscous binder selected from the class consisting of edible oils and fats, gelatin and jelly.

9. A method of making a palatable table spread comprising first swelling soybeans by puffing by subjecting to high pressure steam in a closed pressure vessel in the range of about 90 to 200 pounds per square inch for about 2 to 5 minutes to substantially uniformly penetrate said beans with moisture and then opening said vessel to release the pressure and instantaneously expanding the beans by expansion of the moisture therein, and then heating the swollen beans with infrared radiation having a peak wave length between about 1 to 1.7 microns or between about 7 to 30 microns which is outside of the effective water absorption range to attain a bean temperature between about 200° F. and 300° F. for a period of time sufficient to roast the beans in order to destroy their original bitter taste and enzyme inhibitors without materially adversely affecting the dispersibility of soybean protein, and then grinding the roasted beans and blending with a viscous binder.

References Cited

UNITED STATES PATENTS

| 1,189,128 | 6/1916 | Kellogg | 99—98 |
| 1,615,822 | 2/1927 | Baile | 99—98 |
| 2,267,747 | 12/1941 | Plews | 99—98 |
| 2,279,280 | 4/1942 | Musher | 99—98 |
| 2,316,458 | 4/1943 | Scalise | 99—98 |
| 3,141,777 | 7/1964 | Guidarelli et al. | 99—98 |

OTHER REFERENCES

Perry, Dr. T. W., Reprint from Feedstuffs of Oct. 19, 1963, vol. 35, No. 43, pp. 14, 16, 84, 85.

RAYMOND N. JONES, *Primary Examiner.*

S. E. HEYMAN, *Assistant Examiner.*